United States Patent
Jansen et al.

(10) Patent No.: US 7,956,000 B2
(45) Date of Patent: Jun. 7, 2011

(54) PROCESS FOR ACTIVATING A HYDROTREATING CATALYST

(75) Inventors: Marcel Adriaan Jansen, Nieuw Vennep (NL); Franciscus Wilhelmus Van Houtert, Landsmeer (NL); Toshiyuki Ado, Yokohama (JP); Tetsuro Kamo, Niihama (JP); Naohiro Nishimoto, Kami (JP)

(73) Assignees: Albemarle Europe, SPRL, Louvain-la-Neuve (BE); Nippon Ketjen Co., Ltd., Tokyo (JP)

( * ) Notice: Subject to any disclaimer, the term of this patent is extended or adjusted under 35 U.S.C. 154(b) by 928 days.

(21) Appl. No.: 10/574,228

(22) PCT Filed: Sep. 30, 2004

(86) PCT No.: PCT/EP2004/010982
§ 371 (c)(1), (2), (4) Date: Jun. 11, 2007

(87) PCT Pub. No.: WO2005/035691
PCT Pub. Date: Apr. 21, 2005

(65) Prior Publication Data
US 2007/0275845 A1 Nov. 29, 2007

(30) Foreign Application Priority Data
Oct. 3, 2003 (EP) .................... 03078071

(51) Int. Cl.
*B01J 38/50* (2006.01)
*B01J 38/60* (2006.01)
*B01J 38/62* (2006.01)

(52) U.S. Cl. ............... 502/27; 502/26; 502/29; 502/20; 502/313

(58) Field of Classification Search .............. 502/20, 502/26, 27, 29, 313
See application file for complete search history.

(56) References Cited

U.S. PATENT DOCUMENTS

| | | | | |
|---|---|---|---|---|
| 4,522,928 A | * | 6/1985 | McVicker et al. | 502/26 |
| 5,162,281 A | * | 11/1992 | Kamo et al. | 502/168 |
| 5,389,592 A | * | 2/1995 | Weissman et al. | 502/25 |
| 6,239,054 B1 | * | 5/2001 | Shukis et al. | 502/29 |

FOREIGN PATENT DOCUMENTS

| | | |
|---|---|---|
| EP | 0 601 722 B1 | 9/1998 |
| WO | WO 01/02091 A1 | 1/2001 |

OTHER PUBLICATIONS

INCHEM.org, "Hexanoic Acid", [http://www.inchem.org/documents/icsc/icsc/eics1167.html], Mar. 1998.*
US Department of Health and Human Services, "Occupational Health Guideline for Oxalic Acid," Sep. 1978.*

* cited by examiner

*Primary Examiner* — Timothy C Vanoy
*Assistant Examiner* — Diana J Liao
(74) *Attorney, Agent, or Firm* — Jeremy J. Kliebert

(57) ABSTRACT

The invention pertains to a process for activating an hydrotreating catalyst comprising a Group VIB metal oxide and a Group VIII metal oxide which process comprises contacting the catalyst with an acid and an organic additive which has a boiling point in the range of 80-500° C. and a solubility in water of at least 5 grams per liter (20° C., atmospheric pressure), optionally followed by drying under such conditions that at least 50% of the additive is maintained in the catalyst. The hydrotreating catalyst may be a fresh hydrotreating catalyst or a used hydrotreating catalyst which has been regenerated.

15 Claims, No Drawings

PROCESS FOR ACTIVATING A HYDROTREATING CATALYST

The invention pertains to a process for activating a hydrotreating catalyst. The hydrotreating catalyst to be activated may be either a fresh hydrotreating catalyst or a hydrotreating catalyst which has been used and regenerated. The present invention also pertains to the hydrotreating catalyst obtainable by said process and to its use in hydrotreating.

In general, the object of catalytically hydrotreating hydrocarbon-containing feeds is the removal of impurities. Common impurities are sulfur compounds and nitrogen compounds. The at least partial removal of such impurities from a feed will ensure that, when the final product is burnt, fewer sulfur oxides and/or nitrogen oxides harmful to the environment will be released. In addition, sulfur compounds and nitrogen compounds are toxic to many of the catalysts employed in the oil industry for converting feeds into ready-for-use products. Examples of such catalysts include cracking catalysts, hydrocracking catalysts, and reforming catalysts. It is therefore customary for feeds to be subjected to a catalytic hydrotreatment prior to their being processed in, say, a cracking unit. Catalytic hydrotreatment implies contacting a feed with hydrogen at elevated temperature and pressure in the presence of a hydrotreating catalyst. In this process the sulfur compounds and nitrogen compounds present in the feed are converted into readily removable hydrogen sulfide and ammonia.

In general, hydrotreating catalysts are composed of a carrier with deposited thereon a Group VI metal component and a Group VIII metal component. The most commonly employed Group VI metals are molybdenum and tungsten, while cobalt and nickel are the conventional Group VIII metals. Phosphorus may also be present in the catalyst. The prior art processes for preparing these catalysts are characterised in that a carrier material is composited with hydrogenation metal components, for example by impregnation, after which the composite is calcined to convert the metal components into their oxides. Before being used in hydrotreating, the catalysts are generally presulfided to convert the hydrogenation metals into their sulfides.

Because the requirements as to the legally permitted sulfur and nitrogen contents in fuels are becoming ever stricter, there is a continuous need for hydrotreating catalysts with improved activity. Further, at a given final sulfur content a more active catalyst will make it possible to operate under milder process conditions (energy saving) or to increase the lifespan of a catalyst between regenerations (cycle length).

WO 96/41848 describes a process wherein a hydrotreating catalyst comprising a Group VIII hydrogenation metal oxide and a Group VI hydrogenation metal oxide on a carrier is activated by contacting it with an additive which is at least one compound selected from the group of compounds comprising at least two hydroxyl groups and 2-10 carbon atoms, and the (poly)ethers of these compounds, after which the catalyst is dried under such conditions that the additive substantially remains in the catalyst. The additives described in this reference include sugars and various ethers and polyethers. The catalyst may be either a fresh (not used) catalyst or a used catalyst which has been regenerated.

WO 01/02092 describes a process for regenerating and activating a used additive-based catalyst by contacting it with an oxygen-containing gas at a maximum temperature of 500° C., followed by activating it by contacting with an organic additive, if necessary followed by drying at such a temperature that at least 50% of the additive is maintained in the catalyst. The preferred additives described in this reference are those selected from the group of compounds comprising at least two oxygen-containing moieties and 2-10 carbon atoms and the compounds built up from these compounds. Cited examples include acids, aliphatic-dialcohols, ethers thereof, sugars, and N-containing compounds.

It has now been found, however, that the process described in these references can be improved if the catalyst is activated with the combination of an acid and a specified additive. Accordingly, the present invention pertains to a process for activating an hydrotreating catalyst comprising a Group VIB metal oxide and a Group VIII metal oxide which process comprises contacting the catalyst with an acid and an organic additive which has a boiling point in the range of 80-500° C. and a solubility in water of at least 5 grams per liter (20° C., atmospheric pressure), optionally followed by drying under such conditions that at least 50 wt % of the additive (relative to the total original amount of additive) is maintained in the catalyst. The process of the present invention is suitable for activating fresh hydrotreating catalysts, but also for activating catalysts which have been used in the hydrotreating of hydrocarbon feeds.

The inventors have found that in view of obtaining a high activity after reactivated catalyst it is preferred that in the process according to the invention the activated hydrotreating catalyst comprises a crystalline fraction (defined as weight fraction of crystalline compounds of Group VIB and Group VIII metals relative to the total weight of the catalyst) below 5 wt %, more preferably below 2.5 wt %, even more preferably below 1 wt % and most preferably below 0.5 wt %. Ideally, the activated hydrotreating catalyst comprises substantially no crystalline fraction. The crystalline compounds can be a single crystalline compound or a mixture of different crystalline compounds. For example, in case of a cobalt molybdenum catalyst it was found that the active hydrotreating metals can crystallise in alfa-cobalt molybdate ($\alpha$ $CoMoO_4$). Depending on the hydrotreating metal composition of the catalysts different crystalline compounds can be formed for example nickel molybdate, cobalt tungstate and nickel tungstate, mixtures thereof or mixed metal crystals can be found. The crystalline fraction can be measured by x-ray diffraction techniques.

It was found that the advantages of the process according to the invention can be obtained not only in used regenerated catalyst but also in fresh hydrotreating catalysts. In particular in fresh hydrotreating catalysts that have been calcined, a considerable improvement of the activity can be obtained by using the activation process according to the invention. In calcined fresh hydrotreating catalysts a considerable crystalline fraction was found, in particular when calcined at a temperature above 350° C., or even more so when calcined above 400° C., 460° C. or above 500° C. Very good activity improvements can be obtained when in the process according to the invention the fresh hydrotreating catalyst comprises a crystalline fraction of at least 0.5 wt %, preferably at least 1 wt %, more preferably at least 2.5 wt % and most preferably at least 5 wt %.

The invention also relates to a hydrotreating catalyst obtainable by the processes described above. In particular, to a hydrotreating catalyst comprising a Group VIII metal oxide and a Group VI metal oxide, which catalyst additionally comprises an acid and an organic additive which has a boiling point in the range of 80-500° C. and a solubility in water of at least 5 grams per liter (20° C., atmospheric pressure). The catalyst is preferably a regenerated used catalyst or a calcined fresh catalyst wherein the catalyst preferably comprises a crystalline fraction below 5 wt %, more preferably below 2.5 wt %, most preferably below 1 wt % (expressed as weight fraction of crystalline compounds of Group VIB and Group VIII metals relative to the total weight of the catalyst).

EP-A-0601722 describes a method for preparing a catalyst by impregnation of an alumina carrier substance with a solution containing hydrotreating metal elements, phosphoric acid and organic additives followed by drying at a temperature below 200° C. to prevent decomposition or evaporation of the additives. This method does not concern activation of a fresh or used and regenerated hydrotreating catalyst. In this method the active hydrotreating metals are deposited in the presence of, and complexed with, phosphoric acid and an organic additive in the impregnation solution. It is surprising that used and regenerated or fresh hydrotreating catalyst, in which the hydrotreating metals are already deposited, can be activated with an acid and organic additive having the specified boiling point and solubility features.

The starting material for the process according to the invention is a hydrotreating catalyst comprising a Group VIII hydrogenation metal oxide and a Group VI hydrogenation metal oxide, further indicated as an oxidic catalyst. Generally at least 80% of all of the Group VIII and Group VI hydrogenation metal present in the catalyst is in the oxidic form, preferably at least 90%, more preferably at least 95%, still more preferably at least 98%. The percentage of metals present in the catalyst in oxidic form can be determined by X-ray fluorescence spectroscopy (XRF) or inductively coupled plasma spectroscopy (ICP). The percentages are weight percentages relative to the total weight of the metals.

The oxidic hydrotreating catalyst used as starting material in the process according to the invention may thus be an oxidic hydrotreating catalyst prepared by a process in which hydrogenation metal components are composited with a carrier, after which the composite material is subjected to a calcination step to convert the hydrogenation metal components into their if oxides. However, it may also be a used hydrotreating catalyst which has been regenerated by removing coke therefrom. In this case the catalyst may or may not have contained an additive before its first use.

The starting catalyst comprises a Group VIII metal oxide and a Group VI metal oxide, generally on a carrier. As Group VI metals may be mentioned molybdenum, tungsten, and chromium, with molybdenum or tungsten being preferred. Molybdenum is especially preferred. Group VIII metals include nickel, cobalt, and iron. Nickel, cobalt, or their combination is preferred. The catalyst usually has a metal content in the range of 0.1 to 50 wt. %, calculated as oxides on the overall weight of the catalyst. The Group VI metal component is generally present in an amount of 540 wt. %, calculated as trioxide, preferably 10-35 wt. %; more preferably 15-30 wt. %. The Group VIII metal component is generally present in an amount of 1-10 wt. %, preferably 2-8 wt. %, calculated as oxide. If so desired, the catalyst may also contain other components, such as phosphorus, halogens, and boron. Particularly, the presence of phosphorus in an amount of 1-10 wt. %, calculated as $P_2O_5$, to improve the hydrodenitrogenation activity of the catalyst may be preferred.

The catalyst carrier may comprise the conventional oxides, e.g., alumina, silica, silica-alumina, alumina with silica-alumina dispersed therein, silica-coated alumina, magnesia, zirconia, boria, and titania, as well as mixtures of these oxides. As a rule, preference is given to the carrier being of alumina, silica-alumina, alumina with silica-alumina dispersed therein, or silica-coated alumina. Special preference is given to alumina and alumina containing up to 10 wt. % of silica. A carrier containing a transition alumina, for example an eta, theta, or gamma alumina is preferred within this group, wherein a gamma-alumina carrier is most especially preferred.

The catalyst's pore volume (measured via mercury penetration, contact angle 140°, surface tension of 480 dyn/cm) is not critical to the process according to the invention and will generally be in the range of 0.2 to 2 ml/g, preferably 0.4-1 ml/g. The specific surface area is not critical to the process according to the invention either and will generally be in the range of 50 to 400 $m^2/g$ (measured using the BET method). Preferably, the catalyst will have a median pore diameter in the range of 7-15 nm, as determined by mercury porosimetry, and at least 60% of the total pore volume will be in the range of ±2 nm from the median pore diameter.

The catalyst is employed in the conventional manner in the form of spheres or extrudates. Examples of suitable types of extrudates have been disclosed in the literature (see, int. al., U.S. Pat. No. 4,028,227). Highly suitable for use are cylindrical particles (which may be hollow or not) as well as symmetrical and asymmetrical polylobed particles (2, 3 or 4 lobes).

In the process according to the invention the oxidic hydrotreating catalyst is contacted with an acid and an organic additive having a boiling point in the range of 80-500° C. and a solubility in water of at least 5 grams per liter.

The acid and the additive are incorporated into the catalyst in the liquid form by impregnation. For the acid this will generally mean it being in the dissolved state. For the additive, whether or not a solvent is necessary will depend on its properties. If the additive is sufficiently fluid to enter the catalyst's pores without a solvent being present, a solvent can be dispensed with. Generally, however, a solvent will be used. The solvent generally is water, although other compounds, such as methanol, ethanol, and other alcohols may also be suitable, depending on the nature of the additive and the acid.

In a preferred embodiment of the process of the invention, the catalyst is subjected to an aging step after the incorporation of the acid. The aging step is effected while the catalyst is still wet, that is, before the solvent is removed from the catalyst. It has been found that the aging step is particularly advantageous when a catalyst which has been used in the hydrotreating of hydrocarbon feed is to be reactivated. The aging time applied in the aging step is a function of temperature. Generally, the aging time decreases with increasing aging temperature. The aging step typically takes at least 15 minutes. After a certain time, for example after more than 48 hours, no additional activity improvement is observed. If the aging step is carried out at a temperature between 0° and 50° C., the aging time is typically at least 1 hour, preferably at least 2 hours, more preferably at least 6 hours. If the aging step is carried out at a temperature above 50° C., the aging time is generally at least 0.5 hours, preferably at least 1 hour, more preferably at least 2 hours. It is also possible to effect the aging step at a temperature of above 100° C. under hydrothermal conditions for a period of over 15 minutes. The aging step can also be performed by heating the catalyst with microwaves or induction heating. Preferably, the catalyst composition is aged for a time sufficient to reduce the crystalline fraction below 5 wt percent, more preferably below 2.5 wt %. It was further found, that the time of aging can be considerably reduced and/or significantly better results can be achieved if in the process according to the invention the acid concentration is at least 5 wt %, preferably at least 7 wt %, most preferably at least 10 wt % (relative to the total weight of the catalyst).

If solvent has been used to incorporate the additive and/or the acid into the catalyst, the catalyst may be dried after the impregnation step has been completed to remove at least part of the solvent, generally at least 50%, preferably at least 70%, more preferably at least 80% (in weight percent relative to the original weight of the compound). It is essential to the process according to the invention that any drying step is effected in such a manner that at least part of the additive remains in the catalyst. The catalyst is hence not calcined. In consequence, the drying conditions to be applied depend heavily on the temperature at which the specific additive boils or decomposes. In the context of the present invention, the drying step should be carried out under such conditions that at least 50%, preferably 70%, more preferably 90% of the additive incorporated into the catalyst in the impregnation step is still present in the catalyst after the drying step. Of course, it is preferred to keep as much additive as possible in the catalyst during the drying step, but with the more volatile compounds evaporation during the drying step cannot always be avoided. The drying step may, e.g., be carried out in air, under vacuum, or in inert gas. Generally, it is advantageous to have a drying temperature below 220° C., although a higher or lower temperature may be necessary, depending on the nature of the additive.

The acid and the additive may be incorporated into the catalyst simultaneously or sequentially in no particular order.

In one embodiment, the starting material is contacted with a solution of an acid, optionally followed by drying. Then, the organic additive is incorporated into the catalyst, optionally followed by a drying step under such conditions that at least 50% of the additive remains in the catalyst (in weight percent relative to the original weight of the compound). If in this embodiment an aging step is carried out, it may be performed before or after the organic additive has been incorporated into the catalyst composition.

In another embodiment, in a first step the organic additive is incorporated into the starting material, optionally followed by a drying step under such conditions that at least 50% of the additive remains in the catalyst. Then, the resulting material is contacted with a solution of an acid, optionally followed by an aging step and/or by drying under such conditions that at least 50% of the additive remain in the catalyst.

The advantage of incorporating the acid and the additive into the catalyst in separate steps is that the properties of the impregnation solutions may be tailored to meet the requirements of the acid and the additive. Nevertheless, for reasons of efficiency, it is preferred to contact the starting catalyst with a single impregnation solution comprising both the acid and the additive, optionally followed by an aging step and/or a drying step under such conditions that at least 50% of the additive remains in the catalyst.

The acid may be an inorganic or an organic acid. Inorganic acids are defined as acidic components which do not contain a carbon atom. Examples of inorganic acids include HCl, $H_2SO_4$, $HNO_3$, $H_3PO_4$, $(NH_4)H_2PO_4$, $(NH_4)_2HPO_4$, $H_2PHO_3$, $H_2P_2H_2O_5$, and $H_{(n+2)}P_nO_{(3n+1)}$. Within the group of inorganic acids, the phosphorus-containing acids are preferred, since phosphorus in itself can positively influence the activity of a hydrotreating catalyst. $H_3PO_4$ is particularly preferred.

One disadvantage to the use of inorganic acids is that the counterion, e.g., chloride, sulfate, or nitrate, is incorporated into the catalyst composition. If the activation process of the present invention is repeated a number of times this may lead to an undesirable build-up of these counterions in the catalyst composition. However, depending on the nature of the counterion and on the number of regeneration steps envisaged, this may not be a problem. Organic acids are preferred because they do not have said disadvantage.

In the context of the present specification, an organic acid is defined as a compound comprising at least one carboxylic group (COOH). The organic acid is generally a carboxylic acid comprising at least one carboxyl group and 1-20 carbon atoms (carbon atoms in the carboxyl group included). Suitable acids include acetic acid, citric acid, malic acid, maleic acid, formic acid, glycolic acid, hydroxypropionic acid, hydroxybutyric acid, hydroxyhexanoic acid, tartaric acid, glyceric acid, gluconic acid, oxalic acid, malonic acid, polyacrylic acid, ascorbic acid, and N-containing acids like EDTA and CyDTA (1,2-cyclohexanediaminetetra-acetic acid) etc. Within this group, compounds comprising at least two carboxylic groups are preferred. For combined costs and activity, citric acid, malic acid, maleic acid, malonic acid, and tartaric acid are preferred. Citric acid is particularly preferred.

The organic additive used in combination with the acid in the process according to the invention is an organic compound, viz. a compound comprising at least one carbon atom and at least one hydrogen atom, with a boiling point in the range of 80-500° C. and a solubility in water of at least 5 grams per liter at room temperature (20° C.) (atmospheric pressure). Preferably the additive is an oxygen- or nitrogen-containing compound.

The boiling point of the additive is preferably in the range of 100-400° C., more preferably 150-350° C. The boiling point of the additive is balanced between on the one hand the desire that the additive remain on the catalyst during the preparation process, including the drying step, and on the other hand the need for the additive to be removed from the catalyst during catalyst use or sulfidation. In case the organic additive has no boiling point but instead decomposes in the specified temperature range, the term boiling point is meant to be synonymous with the composition temperature.

The solubility of the additive is at least 5 grams per liter at room temperature, preferably at least 10 grams. It is noted that the solubility requirement for the additive has a two-fold basis. In the first place, compounds meeting this solubility requirement are convenient to apply in impregnation solutions. Additionally it has appeared that compounds which meet these solubility requirements somehow interact with the metal components present in the catalyst leading to an increase in activity of the final product.

Within this definition, various groups of additives may be distinguished.

A first, at this point in time preferred, group of additives is the group of organic compounds comprising at least two oxygen atoms and 2-20 carbon atoms, preferably 2-10 carbon atoms and the compounds built up from these compounds. Organic compounds selected from the group of compounds comprising at least two oxygen-containing moieties, such as a carboxyl, carbonyl or hydroxyl moieties, and 2-10 carbon atoms and the compounds built up from these compounds are preferred. Examples of suitable compounds include butanediol, pyruvic aldehyde, glycolic aldehyde, and acetaldol. At this point in time, preference is given within this group to an additive that is selected from the group of compounds comprising at least two hydroxyl groups and 2-10 carbon atoms per molecule, and the (poly)ethers of these compounds. Suitable compounds from this group include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. This range can be extrapolated to include polyethers like polyethylene glycol. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Of these, ethylene glycol, diethylene glycol, triethylene glycol, tetraethylene glycol, proplylene glycol, dipropylene glycol, and polyethylene glycol with a molecular weight between 200 and 600 are preferred. Another group of compounds comprising at least two hydroxyl groups and 2-10 carbon atoms per molecule are the saccharides. Preferred saccharides include monosaccharides such as glucose and fructose. Ethers thereof include disaccharides such as lactose, maltose, and saccharose. Polyethers of these compounds include the polysaccharides. The organic compounds of this group are preferably substantially saturated, as is evidenced by a iodine number of less than 60, preferably less than 20.

A second group of organic additives suitable for use in the present invention are those compounds comprising at least one covalently bonded nitrogen atom and at least one carbonyl moiety. This type of organic compound preferably comprises at least two carbonyl moieties. It is preferred that at least one carbonyl moiety is present in a carboxyl group. It is furthermore preferred that at least one nitrogen atom is covalently bonded to at least two carbon atoms. A preferred organic compound satisfies formula (I) or (II)

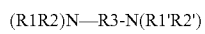  (I)

(R1R2)N—R3-N(R1'R2')

  (II)

N(R1R2R1')

wherein R1, R2, R1' and R2' are independently selected from alkyl, alkenyl, and allyl, with up to 10 carbon atoms optionally substituted with one or more groups selected from carbonyl, carboxyl, ester, ether, amino, or amido. R3 is an alkylene group with up to 10 carbon atoms which may be interrupted by —O— or —NR4-. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) or (II) comprises at least one carbonyl moiety.

Preferably, at least two of R1, R2, R1' and R2' (formula (I)) and at least two of R1, R2 and R1' (formula (II)) have the formula —R5-COOX, wherein R5 is an alkylene group having 1-4 carbon atoms, and X is hydrogen or another cation, such as an ammonium, sodium, potassium and/or lithium cation. If X is a multivalent cation, one X can adhere to two or more —R5-COO groups. Typical examples of a compound of formula (I) are ethylene diamine(tetra)acetic acid (EDTA), hydroxyethylene diamine triacetic acid, and diethylene triamine pentaacetic acid. A typical example of a compound of formula (II) is nitrilotriacetic acid (NTA). For reasons of solubility, the salts of these compounds may be preferred.

It is noted that the above-mentioned description of the organic additive encompasses various acidic components. Where in the context of the present invention the combination of an acid and an organic additive is discussed, this means that (at least) two different compounds are used wherein one is an acid and wherein the other meets the requirements as to solubility and boiling point placed on the organic additive. The latter compound may or may not also be acidic.

From an environmental point of view, it is preferred to employ additives which are essentially free of sulfur. Further, sulfur-containing additives generally are not stable in relation to oxygen. Therefore, if sulfur-containing additives were to be employed, all subsequent process steps would have to be carried out under an inert atmosphere. Also for this reason it is preferred to employ sulfur-free additives. This goes both for the acid and for the organic additive.

A single compound as well as a combination of compounds may be used as additive.

The total amount of acid and additive used in the process according to the invention, and the total amount of acid and additive present in the catalyst according to the invention is at least 0.01, preferably at least 0.05, more preferably at least 0.1 mote of total of acid and additive per mole of the total of Group VIB and Group VIII metals. Generally, the molar ratio will be at most 3, preferably at most 2.

If an inorganic acid is used, the amount of acid is generally between 0.01 and 1 mole per mole of total of Group VIB and Group VIII metals, preferably between 0.05 and 0.5 mole mole per mole of total of Group VIB and Group VIII metals.

If an organic acid is used, the amount of acid is generally between 0.01 and 1 mole per mole of total of Group VIB and Group VIII metals, preferably between 0.05 and 0.5 mole per mole of total of Group VIB and Group VIII metals. The amount of organic additive is generally between 0.1 and 2.5 mole per mole of total of Group VIB and Group VIII metals, preferably between 0.15 and 1 mole per mole of total of Group VIB and Group VIII metals, more preferably between 0.2 and 1 mole per mole of total of Group VIB and Group VIII metals.

The molar ratio between acid and additive is generally 0.01-10:1, preferably 0.1-5:1, more preferably 0.15-3:1.

In general, if the total amount of acid and additive added is too low, the advantageous effect of the present invention will not be obtained. On the other hand, the addition of an exceptionally large total amount of acid and additive will not improve the effect of the present invention. As will be clear to the person skilled in the art, the exact amount of acid and additive to be used in a specific situation will depend upon a variety of parameters including the metals content of the catalyst, the pore volume and pore size distribution of the catalyst, the nature of the acid and additive, the solvent to be used in the impregnation solution, the impregnation conditions, etc. It is well within the scope of the person skilled in the art to determine the optimum amount of acid and additive to be used in each specific situation, taking the above-mentioned variables into account.

The present invention also pertains to the hydrotreating catalyst which comprises a Group VIII metal oxide and a Group VI metal oxide on a carrier, which catalyst additionally comprises an acid and an organic additive as described above.

The dried additive-containing hydrotreating catalyst of the present invention may be subjected to a sulfiding step before it is used in the hydrotreating of hydrocarbon feeds, but, as has been explained before, this is not necessary. If it is decided to sulfide the catalyst before use, this can be done in one of the ways known in the art. For example, it is possible to contact the catalyst with inorganic or organic sulfur compounds, such as hydrogen sulfide, elemental sulfur, or organic polysulfides, or to sulfide the catalyst by contacting it with a hydrocarbon feed to which a sulfur compound has been added. All of this will be known to the skilled person as catalyst sulfiding or presulfiding.

The present catalysts can be used in the hydrotreating of a wide range of feeds. To effect one or more of hydrodesulfurisation, hydrodenitrogenation; and hydrodearomatisation. Examples of suitable feeds include middle distillates, kero, naphtha, vacuum gas oils, and heavy gas oils. The catalyst is particularly suitable for use in ultra-deep hydrodesulfurisation, viz. hydrodesulfurisation to a product suphur content below 200 ppm, more in particular to product sulfur content below 50 ppm. The conventional process conditions, such as temperatures in the range of 250°-450° C., pressures in the range of 5-250 bar, space velocities In the range of 0.1-10 h−1, and H2/oil ratios in the range of 50-2000 Nl/l, can be applied here.

As indicated above, the catalyst to be activated in the process according to the invention is either a fresh hydrotreating catalyst or used and regenerated hydrotreating catalyst.

The fresh oxidic hydrotreating catalyst suitable for use as starting material in the process according to the invention are known in the art. They may be obtained, e.g., as follows. A carrier precursor is prepared, e.g., in the case of alumina, in the form of an alumina hydrogel (boehmite). After it has been dried or not, e.g., by means of spray-drying, it is shaped into particles, for example by extrusion. The shaped particles are calcined at a temperature in the range of 400° to 850° C., resulting, in the case of alumina, in a carrier containing a transition alumina, e.g., a gamma, theta, or eta-alumina. Then, suitable amounts of precursors for the hydrogenation metals and the optional other components, such as phosphorus, are deposited on the catalyst, for example in the form of an aqueous solution. In the case of Group VI metals and Group VIII metals, the precursors may be ammonium molybdate, ammonium tungstenate, cobalt nitrate and/or nickel nitrate. Suitable phosphorus component precursors include phosphoric acid and the various ammonium hydrogen phosphates. After an optional drying step at a temperature in the range of 25°-200° C., the resulting material is calcined at a temperature in the range of 350°-750° C., more in particular 425 to 600° C., to convert all metal component precursors, and the optional other component precursors to form oxide components.

It will be clear to the skilled man that there can be a wide number of variations on this method. Thus, it is possible to apply a plurality of impregnating steps, the impregnating solutions to be used containing one or more of the component precursors that are to be deposited, or a portion thereof. Instead of impregnating techniques there can be used dipping methods, spraying methods, etc. With multiple impregnation, dipping, etc. drying and/or calcining may be carried out in between. Alternatively, one or more component precursors can be mixed wholly or in part with the carrier prior to the shaping step being carried out. In such an embodiment the component precursor material, or a portion thereof, can be deposited on the not yet shaped carrier material, say, a powder, by means of, e.g., impregnation, after which the shaping step is carried out. Alternatively, it is possible to intimately mix one or more component precursors wholly or in part with the carrier material during the shaping step rather than prior to it. Techniques that are suitable for this process are co-pelletisation and co-extrusion. It is recommended that the group VIB metal component precursor employed in this process be molybdenum trioxide. Oxidic hydrotreating catalysts and the processes for preparing them are part of the common general knowledge of the skilled person and described in, e.g., U.S. Pat. No. 4,738,767, U.S. Pat. No. 4,062,809, U.S. Pat. No. 4,500,424, GB 1 504 586, U.S. Pat. No. 4,212,729, U.S. Pat. No. 4,326,995, U.S. Pat. No. 4,051,021, U.S. Pat. No. 4,066,574, EP-A 0 469675.

The activation process of the present invention is also applicable to the catalyst which has been used in the hydrotreating of hydrocarbon feeds and subsequently regenerated.

The present invention also pertains to a combined process for regenerating and activating a used hydrotreating catalyst wherein a used hydrotreating catalyst comprising a Group VIB metal oxide and a Group VIII metal oxide is first subjected to a regeneration step to remove carbonaceous and sulfurous deposits, followed by activating the thus obtained material by contacting it with an acid and an organic additive which has a boiling point in the range of 80-500° C. and a solubility in water of at least 5 grams per liter (20° C., atmospheric pressure).

The regeneration step of the process according to the invention is carried out by contacting the used additive-based catalyst with an oxygen-containing gas under such conditions that after regeneration, the carbon content of the catalyst generally is below 3 wt. %, preferably below 2 wt. %, more preferably below 1 wt. %. After regeneration, the sulfur content of the catalyst generally is below 2 wt. %, preferably below 1 wt. %. Before the regeneration step, the carbon content of the catalyst generally is above 5 wt. %, typically between 5 and 25 wt. %. The sulfur content of the catalyst before the regeneration step generally is above 5 wt. %, typically between 5 and 20 wt. %.

The maximum catalyst temperature during the regeneration step will be governed by the properties of the catalyst to be regenerated and by process constraints, a higher maximum temperature being preferred in principle because this makes ft possible to reduce the regeneration time. However, a high regeneration temperature carries the risk of damaging the catalyst. Catalysts with a higher metal content will generally require a lower maximum catalyst temperature than catalysts with a lower metal content. Generally, the maximum catalyst temperature during the regeneration process is at most 650° C., preferably at most 575° C., more preferably at most 550° C., still more preferably at most 525° C.

The maximum catalyst temperature during the regeneration process generally is at least 300° C., preferably at least 350° C., more preferably at least 400° C., still more preferably at least 450° C.

It is noted that in this specification any temperature given relates to the temperature of the catalyst, except when explicitly indicated otherwise. The catalyst temperature can be determined in any way known to the skilled person, e.g., by way of appropriately placed thermocouples.

It is preferred for the regeneration step in the presence of oxygen to be carried out in two steps, namely a first lower-temperature step and a second higher-temperature step. In the first, lower-temperature step, the catalyst is contacted with an oxygen-containing gas at a temperature of 100 to 370° C., preferably 175 to 370° C. In the second, higher-temperature regeneration step, the catalyst is contacted with an oxygen-containing gas at a temperature of In the second, higher-temperature regeneration step, the catalyst is contacted with an oxygen-containing gas at a temperature of 300 to 650° C., preferably 320 to 550° C., still more preferably 350-525° C. The temperature during the second step is higher than the temperature of the first step discussed above, preferably by at least 10° C., more preferably by at least 20° C. The determination of appropriate temperature ranges is well within the scope of the skilled person, taking the above indications into account.

It is preferred for the catalyst to be regenerated in a moving bed process, preferably, if applicable, at a bed thickness of 1-15 cm. In the context of the present specification, the term "moving bed" is intended to refer to all processes wherein the catalyst is in movement as compared to the unit, including ebullated bed processes, fluidised processes, processes in which the catalyst is rotated through a unit, and all other processes wherein the catalyst is in movement.

The duration of the regeneration process including stripping will depend on the properties of the catalyst and the exact way in which the process is carried out, but will generally be between 0.25 and 24 hours, preferably between 2 and 16 hours.

The regenerated catalyst will be contacted with the acid and additive in the process according to the invention as has been described above.

The invention will be illustrated by the following examples, but is not intended to be limited thereto or thereby.

EXAMPLE 1

Activating Used Catalyst with Citric Acid and Polyethylene Glycol

A hydroprocessing catalyst that had been used for 12 months on the hydrotreating of a LGO feedstock was regenerated as follows. The catalyst contained 23.2 wt. % of carbon, 9 wt. % of sulfur, and 22.4 wt. % of hydrocarbon.

In a first step, the hydrocarbon was removed from the catalyst by stripping. Then, the catalyst was regenerated by contacting it with air at a temperature of 490-500° C. for a period of 24 hours. The regenerated starting material thus obtained contained molybdenum, cobalt, and phosphorus on an alumina carrier.

The regenerated catalyst was impregnated via pore volume impregnation with an impregnation solution containing citric acid and polyethylene glycol in an amount of 0.1 mole acid per mole of hydrogenation metals and 0.5 mole polyethylene glycol per mole of hydrogenation metals, respectively, and subsequently dried overnight at a temperature of 120° C.

The catalyst was tested on a LGO feedstock having the following properties:

| | |
|---|---|
| S (wt. %) | 1.4837 |
| N (wt. ppm) | 170 |
| density (15° C., g/ml) | 0.8609 |
| viscosity (50° C., cSt) | 4.11 |
| H (wt. %) | 12.90 |
| Distillation Data (ASTM D 86, ° C.) | |
| Initial boiling point | 182 |
| 10 vol. % | 288 |
| 50 vol. % | 325 |
| 90 vol. % | 364 |
| Final boiling point | 375 |

The catalyst was tested at a liquid hourly space velocity (LHSV) of 1.5 h−1 and a hydrogen to oil ratio of 200 Nl/l at various conditions with varying temperature and pressure. Each condition was maintained for two days. The catalyst was tested side by side with a fresh catalyst. The test conditions and activities of the two catalysts are given below.

| | T (° C.) | PpH2 (MPa) | fresh catalyst RVA-HDS (ppm S) | reactivated catalyst RVA-HDS (ppm S) |
|---|---|---|---|---|
| 1 | 345 | 5.1 | 100 (42) | 93 (50) |
| 2 | 350 | 5.1 | 100 (28) | 93 (33) |
| 3 | 350 | 3.0 | 100 (159) | 98 (165) |
| 4 | 350 | 5.1 | 100 (55) | 103 (52) |

As can be seen from the above table, the activity of the spent and reactivated catalyst had been brought back to an activity which is substantially as high as the activity of the fresh catalyst. In comparison, the activity of the spent catalyst after regeneration was 70% as compared with its initial activity.

EXAMPLE 2

Activating Used Catalyst with Phosphoric Acid and Polyethylene Glycol

A hydroprocessing catalyst that had been used for 24 months on the hydrotreating of a LGO feedstock was regenerated as follows. The catalyst contained 25.4 wt. % of carbon, 8.8 wt. % of sulfur, and 18.3 wt. % of hydrocarbon. In a first step, the hydrocarbon was removed from the catalyst by stripping. Then, the catalyst was regenerated by contacting it with air at a temperature of 450° C. for a period of 24 hours. The regenerated starting material thus obtained contained molybdenum, cobalt, and phosphorus on an alumina carrier.

The regenerated catalyst was impregnated via pore volume impregnation with an impregnation solution containing phosphoric acid and polyethylene glycol in an amount of 0.2 mole polyethylene glycol per mole of hydrogenation metals, and subsequently dried overnight at a temperature of 120° C. The final catalyst contained 4.8 wt. % of phosphorus, calculated as $P_2O_5$ while the original catalyst contained 1.6 wt. %.

The catalyst was tested on a LGO feedstock having the following properties:

| | |
|---|---|
| S (wt. %) | 1.323 |
| N (wt. ppm) | 110 |
| density (15° C., g/ml) | 0.8574 |
| Distillation Data (ASTM D 86, ° C.) | |
| Initial boiling point | 183 |
| 10 vol. % | 253 |
| 50 vol. % | 298 |
| 90 vol. % | 360 |
| Final boiling point | 380 |

The catalyst was tested at a hydrogen partial pressure of 3.92 MPa, a liquid hourly space velocity (LHSV) of 1.5 h−1, and a hydrogen to oil ratio of 200 Nl/l at various conditions with varying temperatures. Each condition was maintained for two days. The catalyst was tested side by side with a fresh catalyst. The test conditions and activities of the two catalysts are given below.

| | T (° C.) | fresh catalyst RVA-HDS (ppm S) | reactivated catalyst RVA-HDS (ppm S) |
|---|---|---|---|
| 1 | 340 | 100 (114) | 98 (120) |
| 2 | 350 | 100 (39) | 99 (41) |
| 3 | 330 | 100 (406) | 101 (398) |

As can be seen from the above table, the activity of the spent and reactivated catalyst had been brought back to an activity which is substantially as high as the activity of the fresh catalyst. In comparison, the relative volume activity for HDS of the spent catalyst after having been used for 24 months in the hydrotreating of a hydrocarbon oil had decreased to 53% as compared with its initial relative volume activity.

EXAMPLE 3

Activating Used Catalyst with Citric Acid and Polyethylene Glycol

A hydroprocessing catalyst that had been used in the hydrotreating of a hydrocarbon feedstock was regenerated as follows. The catalyst contained 17.9 wt. % of carbon and 10.7 wt. % of sulfur. The catalyst was regenerated by contacting it with air at a temperature of 500-530° C. The regenerated starting material thus obtained contained molybdenum, nickel, and phosphorus on an alumina carrier.

The regenerated catalyst was impregnated via pore volume impregnation with an impregnation solution containing citric acid and polyethylene glycol in an amount of 0.09 mole acid per mole of hydrogenation metals and 0.22 mole polyethylene glycol per mole of hydrogenation metals, respectively, and subsequently aged for 24 hours while wet and dried overnight at a temperature of 90° C.

The catalyst was tested on a CGO feedstock having the following properties:

| | |
|---|---|
| S (wt. %) | 2.44 |
| N (wt. ppm) | 3546 |
| density (15° C., g/ml) | 0.9173 |
| H (wt. %) | 11.7 |
| Distillation Data (ASTM D 1160, ° C.) | |
| Initial boiling point | 176° C. |
| 10 vol. % | 250° C. |
| 50 vol. % | 332° C. |
| 90 vol. % | 412° C. |
| Final boiling point | 503° C. |

The catalyst was tested at a temperature of 387° C., a pressure of 100 bar, a liquid hourly space velocity (LHSV) of 2.1 h−1, and a hydrogen to oil ratio of 1000 Nl/l. The hydrodenitrogenation activity of the regenerated and reactivated catalyst was 90% of the hydrodenitrogenation activity of the fresh catalyst. In comparison, the activity of the spent catalyst after regeneration but before reactivation was about 60% of the activity of the fresh catalyst.

COMPARATIVE EXPERIMENTS 1 TO 3 AND EXAMPLES 4 TO 8

In Comparative experiments 1 to 3 and Examples 4 to 8, different catalysts were prepared as described below. The catalysts were tested on liquid gas oil (LGO) at a temperature of 340° C., a pressure of 45 bar, a liquid hourly space velocity (LHSV) of 2.5 h−1, and a hydrogen to oil ratio of 200 Nl/l. The hydrodesulphurisation activity was measured. The measured relative volume activity values (RVA) are indicated in the table below.

The crystalline fraction (CRYS) of cobalt molybdate was measured using x-ray diffraction. The crystalline fraction (expressed as weight percentage relative to the catalyst weight) is evaluated from the x-ray diffractogram by evaluating peak area of the α-cobalt molybdate crystal reflections against a calibration curve determined from a hundred percent crystalline α-cobalt molybdate.

All reactivations were carried out by pore volume impregnation with a solution containing the organic additive and/or the acid, followed by ageing for 2 hours at 60° C., followed by drying at 120° C.

Comparative experiment 1 (CE1) is the regenerated catalyst described in example 1. In comparative experiment 2 (CE2), the catalyst of CE1 is reactivated using only citric acid (CA) in amount of 5 w % (relative to the catalyst weight). In comparative experiment 3 (CE3), the catalyst of CE 1 is activated using only polyethylene glycol (PEG) In amount of 10 w % (relative to the catalyst weight). In example 4 according to the invention (Ex4) the catalyst of CE 1 is activated with 4 w % CA and 10 wt % PEG. In example 5 (Ex5), the catalyst of CE 1 is activated with 10 w % CA and 10 wt % PEG. In example 6 (Ex6), the catalyst of CE 1 is activated with 3.75 w % acetic acid (HAC) and 10 wt % PEG. In example 7 (Ex7), the catalyst of CE 1 is activated with 4 w % CA and 5 wt % glycerol (GLY).

It can be concluded that the process according to the invention results in an almost complete recovery of the catalytic activity of the used and regenerated catalyst, in particular at higher citric acid contents. The examples show a synergistic effect of the acid and the organic additive.

Comparative experiment 4 (CE4) concerns a fresh catalyst comprising cobalt and molybdenum on a silica/alumina carrier, which has been calcined at a temperature of 500° C. Example 8 according to the invention (Ex8) is the catalyst of CE4 reactivated with 4 wt % CA and 10 w % PEG. Example 8 shows that significant activity improvement can also be obtained by reactivating fresh catalyst.

| Exp | Acid | Additive | RVA | CRYS |
|---|---|---|---|---|
| CE 1 | — | — | 42 | 8.4 |
| CE 2 | CA | — | 46 | |
| CE 3 | — | PEG | 50 | |
| Ex 4 | CA | PEG | 61 | 2.4 |
| Ex 5 | CA 10% | PEG | 97 | <0.5 |
| Ex 6 | HAC | PEG | 55 | |
| Ex 7 | CA | GLY | 54 | |
| CE 4 | — | — | 70 | 2.1 |
| Ex 8 | CA | PEG | 76 | |

The invention claimed is:

1. A process for activating an hydrotreating catalyst comprising a Group VIB metal oxide and a Group VIII metal oxide which process comprises contacting the catalyst with an acid and an organic additive which has a boiling point in the range of 80-500° C. and a solubility in water of at least 5 grams per liter (20° C., atmospheric pressure), optionally followed by drying under such conditions that at least 50 wt % of the additive is maintained in the catalyst.

2. The process according to claim 1, wherein the activated hydrotreating catalyst comprises a crystalline fraction (expressed as weight fraction of crystalline compounds of Group VIB and Group VIII metals relative to the total weight of the catalyst) below 5 wt %.

3. The process according to claim 1 or 2, wherein the activated hydrotreating catalyst comprises substantially no crystalline fraction.

4. The process according to claim 1 or 2, wherein the hydrotreating catalyst is a used hydrotreating catalyst which has been regenerated.

5. The process according to claim 1 or 2, wherein the hydrotreating catalyst is a fresh hydrotreating catalyst.

6. The process according to claim 5, wherein the fresh hydrotreating catalyst has been calcined.

7. The process according to claim 5, wherein the fresh hydrotreating catalyst comprises a crystalline fraction of at least 0.5 wt %.

8. The process of claim 1, wherein the catalyst after contacting with the acid is subjected to an aging step while wet.

9. The process according to claim 8, wherein the catalyst composition is aged for a time sufficient to reduce the crystalline fraction below 5 wt %.

10. The process according to claims 1, 2, 8, or 9, wherein the acid concentration is at least 5 wt % (relative to the total weight of the catalyst).

11. The process according to any one of claim 1, 2, 8, or 9 wherein the acid is an inorganic acid.

12. The process according to any one of claim 1, 2, 8, or 9 wherein the acid is a carboxylic acid comprising at least one carboxyl group and 1-20 carbon atoms.

13. The process according to claim 12 wherein the acid is citric acid.

14. The process according to any one of claim 1, 2, 8, or 9 wherein the additive is an organic oxygen- or nitrogen-containing compound, with a boiling point in the range of 100-400° C. and a solubility in water of at least 5 grams per liter at room temperature (20° C.) (atmospheric pressure).

15. The process according to claim 14 wherein the additive is selected from the group of compounds comprising at least two hydroxyl groups and 2-10 carbon atoms per molecule, and the (poly)ethers of these compounds.

* * * * *